(12) United States Patent
Henzler et al.

(10) Patent No.: US 9,360,348 B2
(45) Date of Patent: Jun. 7, 2016

(54) SENSOR DEVICE, IN PARTICULAR FOR USE IN A MOTOR VEHICLE

(75) Inventors: Stephan Henzler, Gomaringen (DE); Wolfgang Woernle, Neustetten (DE); Alexander Herrmann, Reutlingen (DE); Benjamin Bertsch, Lichtenstein (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 14/233,809

(22) PCT Filed: Jun. 1, 2012

(86) PCT No.: PCT/EP2012/060416
§ 371 (c)(1),
(2), (4) Date: Jan. 20, 2014

(87) PCT Pub. No.: WO2013/010711
PCT Pub. Date: Jan. 24, 2013

(65) Prior Publication Data
US 2014/0137656 A1 May 22, 2014

(30) Foreign Application Priority Data

Jul. 20, 2011 (DE) .......................... 10 2011 079 446

(51) Int. Cl.
*G01L 7/00* (2006.01)
*G01D 11/24* (2006.01)
*G01D 11/30* (2006.01)

(52) U.S. Cl.
CPC .............. *G01D 11/245* (2013.01); *G01D 11/30* (2013.01)

(58) Field of Classification Search
CPC .............................. G01D 11/30; G01D 11/245
USPC ....................................... 73/204.22, 756, 855
See application file for complete search history.

(56) References Cited

U.S. PATENT DOCUMENTS 5,648,615 A * 7/1997 Jeske et al. ...................... 73/756
5,744,713 A 4/1998 Wienand et al.
(Continued)

FOREIGN PATENT DOCUMENTS

DE 1590853 5/1970
DE 10041263 2/2002
(Continued)

OTHER PUBLICATIONS

Machine translation of WO2009121426 A2 Description, Date of Publication: Oct. 8, 2009, Date of translation: Jul. 6, 2015, Publisher: European Patent Office, Espacenet.*
International Search Report for Application No. PCT/EP2012/060416 dated Oct. 5, 2012 (2 pages).

*Primary Examiner* — Lisa Caputo
*Assistant Examiner* — Roger Hernandez-Prewit
(74) *Attorney, Agent, or Firm* — Michael Best & Friedrich LLP

(57) ABSTRACT

The invention relates to a sensor device (10), in particular for use in a motor vehicle, having a housing (11) for accommodating a sensor element (1), wherein the sensor element (1) has electrical contact areas (2, 3) which are connected to electrical plug connections (18, 19) arranged in the housing (11) in an electrically conductive manner in the region of contacts (23, 24) of the plug connections (18, 19), wherein a force is applied to the sensor element (1) for the purpose of making electrical contact with a housing element in the direction of the plug connections (18, 19). The invention provides for the electrical plug connections (18, 19) to be arranged in a stationary manner in the housing (11) in the region of the contacts (23, 24) with the electrical contact areas (2, 3) of the sensor element (1), and for a support to be formed between the sensor element (1) and the housing (11) in such a manner that the sensor element (1) has three-point contact in the housing (11).

11 Claims, 5 Drawing Sheets

(56) References Cited

U.S. PATENT DOCUMENTS

| | | |
|---|---|---|
| 6,591,689 B2 * | 7/2003 | Nidan et al. .............. 73/754 |
| 7,426,868 B2 * | 9/2008 | Fessele et al. ............ 73/756 |
| 7,549,234 B2 | 6/2009 | Holzapfel et al. |
| 8,052,854 B1 | 11/2011 | Hunter et al. |
| 2004/0218309 A1 | 11/2004 | Seigler |
| 2011/0088478 A1 | 4/2011 | Shimase |

FOREIGN PATENT DOCUMENTS

| | | |
|---|---|---|
| EP | 0088596 | 9/1983 |
| EP | 395922 | 11/1990 |
| WO | 2009044942 | 4/2009 |
| WO | 2009121426 | 10/2009 |

* cited by examiner

SENSOR DEVICE, IN PARTICULAR FOR USE IN A MOTOR VEHICLE

BACKGROUND OF THE INVENTION

The invention relates to a sensor device, in particular for use in a motor vehicle having a housing for accommodating a sensor element, wherein the sensor element has electrical contact areas which are connected to electrical plug connections arranged in the housing in an electrically conductive manner in the region of contacts of the plug connections, wherein a force is applied to the sensor element for the purpose of making electrical contact with a housing element in the direction of the plug connections.

Such a sensor device is disclosed by the German patent specification DE 10 2008 000 889 A1 of the applicant. The known sensor device, which is designed as a pressure sensor, has a housing for accommodating a sensor element. The sensor element is thereby of block-shaped design according to one embodiment and has contact areas, which are disposed on the bottom side of said sensor element so as to be integrated therein, for electrically contacting said sensor element to contacts of plug connections. The plug connections are disposed or, respectively, designed as pin terminals in the housing, wherein the end regions which face the sensor element and comprise the contacts of the plug connections are resiliently disposed or designed. When mounting the sensor element in the housing, the sensor element is placed against a surface of the inside region of the housing, wherein the electrical contact areas disposed on the bottom side of the sensor element simultaneously come in contact with the contacts of the plug connections and thereby apply a force to said contacts so that said contacts are elastically deformed. A housing element designed as a housing cover is used, for example, to press down or hold down the sensor element in the housing. In order to achieve a reliable electrical contacting of the sensor element in the disclosed sensor device when said sensor element is planarly disposed in the housing, the previously described elastic or resilient disposal of the plug connections is required. The design of such plug connections, which in the case of the German patent specification DE 10 2008 000 889 A1 comprise a curved shape in the region of the contacts and an expansion space to ensure the mobility of the contacts, is relatively complicated.

SUMMARY OF THE INVENTION

Based on the prior art described above, the aim underlying the invention is to further develop a sensor device in such a manner that a particularly simple manufacturability of the contacting between the plug connections and the sensor element is facilitated while simultaneously favorable manufacturing costs and reliable electrical contacting are provided. This aim is met according to the invention by a sensor device by virtue of the fact that the electrical plug connections are arranged in a stationary manner in the housing in the region of the contacts with the electrical contact areas of the sensor element and that a support is formed between the sensor element and the housing in such a manner that the sensor element has three-point contact in the housing. In other words, this means that the plug connections are rigidly arranged or formed in the region of the electrical contacting with the sensor element which simplifies the design and arrangement of the plug connections. In addition, a defined electrical contacting of the sensor element to the plug connections is ensured by the three-point contact of the sensor element in the housing.

In order to structurally implement the aforementioned three-point contact, provision is preferably made for punctiform supports to be formed in each case between the electrical contact areas of the sensor element and the contacts of the plug connections as well as in a support region between the sensor element and the housing, preferably by punctiform configuration of the contacts of the plug connections and a punctiform configuration of the support region on the housing.

In order to implement a particularly efficient installation process when using as few housing parts as possible, provision is furthermore made for the housing element to be a housing cover and for the sensor element to be covered by the housing cover. In so doing, an installation process is facilitated in which the sensor element disposed in the housing is pressed by the housing cover towards the three-point contact, wherein the housing cover simultaneously closes the housing.

An embodiment is particularly preferred in which an elastic intermediate element is disposed between the housing cover and the sensor element. As a result, component tolerances can be compensated and a reliable electrical contact can be produced.

In particular when using the sensor device as a pressure sensor, provision can thereby be made for the sensor element to have a measurement surface which is surrounded by the intermediate element and is sealed towards the housing interior and for the housing cover to have a channel which connects the region of the measurement surface to the environment. A targeted air guidance is thereby facilitated through the channel towards the measurement surface by means of the intermediate element which surrounds the measurement surface in a sealing manner; thus enabling such a pressure sensor to operate particularly safely and reliably.

In order to facilitate a mounting of the housing element to the housing which is as simple and cost effective as possible and at the same time is particularly reliable by functional standards, it is furthermore proposed that the housing element be connected to the housing by means of a latching connection. Such a latching connection can be very easily implemented without additional auxiliary materials or joining elements (adhesives, screws).

In order to seal off the latching connection between the housing element and the housing towards the outside so that the housing interior is protected against the ingress of moisture or something similar, it is furthermore proposed that a sealing element is disposed between the housing element and the housing, said sealing element being capable of having a force applied thereto upon forming the latching connection.

The mounting process of the housing element to the housing can furthermore be safely and reliably implemented if guide elements are present for the correct angular mounting of the housing element to the housing. As a result, misalignments during mounting which can possibly incur damage to components are prevented.

A further embodiment of the invention makes provision for a positioning device to be provided in the housing to position the sensor element with respect to the contacts of the plug connections. It is thereby ensured in particular when mounting the housing element or the housing cover that the sensor element is disposed in the correct position thereof with respect to the contacts of the plug connections.

Further advantages, features and details of the invention ensue from the following description of preferred exemplary embodiments as well as with the aid of the drawings.

DETAILED DESCRIPTION

Figure 1:
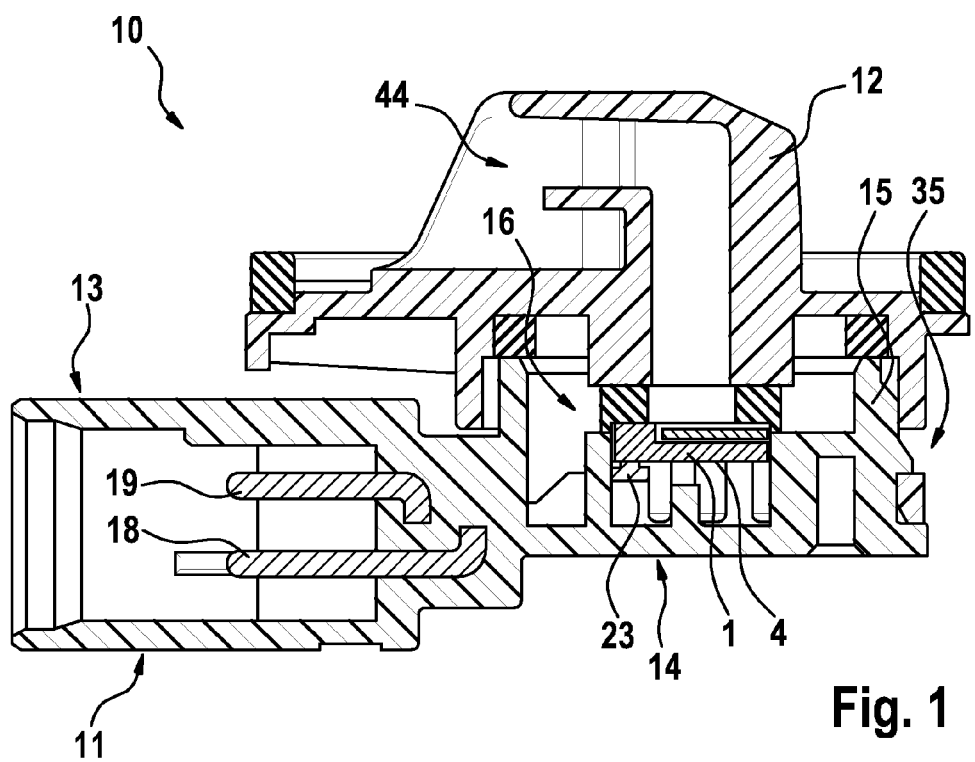
FIG. 1 depicts a longitudinal section through a sensor device according to the invention, which is provided as a pressure sensor device in a motor vehicle.

Identical components or components serving the same function are provided with the same reference numerals in the figures.

A sensor device 10 according to the invention is depicted in FIG. 1 as it is to be used as a pressure sensor in a motor vehicle. The invention is however not intended to be limited to pressure sensors for use in motor vehicles but can, if need be with corresponding adaptations or modifications, be applied to any other sensor devices.

Figure 2:
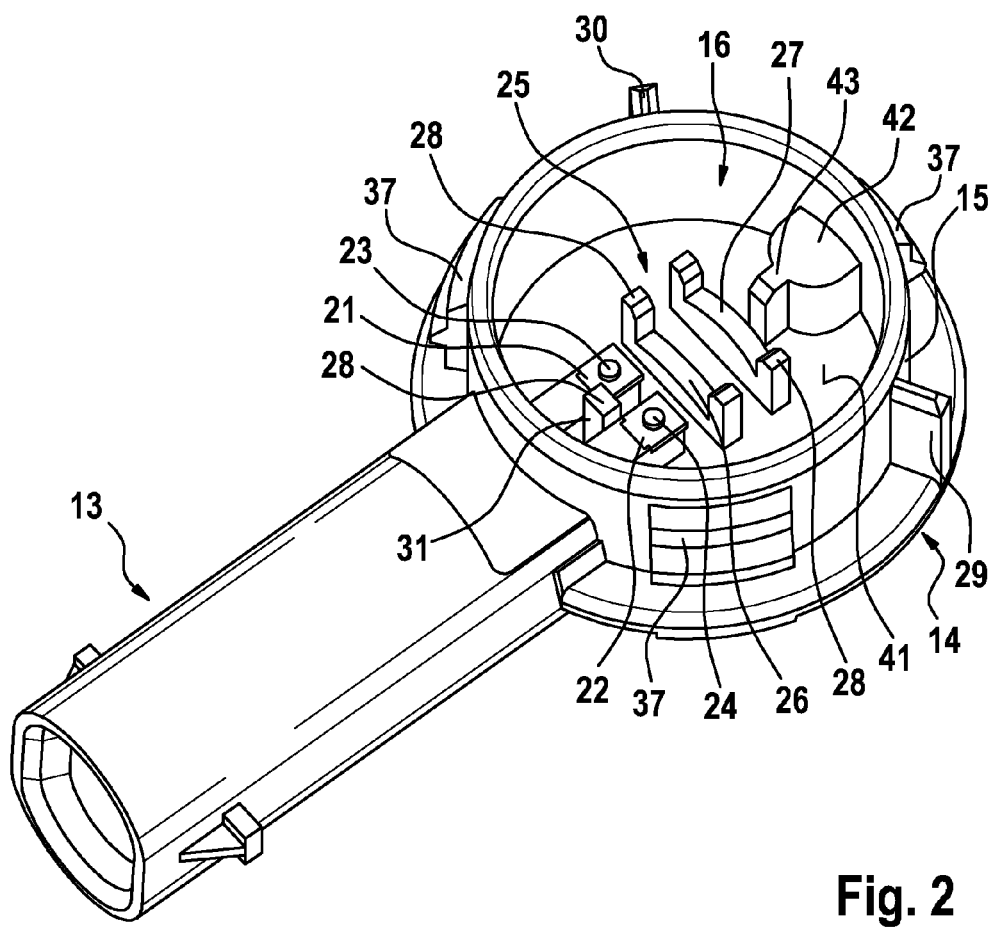
FIG. 2 depicts a housing as it is used as a component of the sensor device pursuant to FIG. 1 in a perspective view from above.

The sensor device 10 has a housing 11 in the shape of a housing bottom part which can be closed by means of a housing cover 12. As is particularly apparent in an overall view of both FIGS. 1 and 2, the housing 11 comprises an elongated plug connection region 13, which is adjoined by a receiving region 14 that is substantially of round configuration when viewed from above and serves to accomodate a sensor element 1 depicted in FIGS. 1, 4 and 5. The receiving region 14 has a circumferential wall 15 in the shape of a circle which forms an interior space 16 for receiving said sensor element 1. Two plug connections 18, 19 are disposed in the housing 11, the former being conjointly encapsulated and thus fixedly accommodated in the housing 11 during formation of said housing 11 in the plastic injection molding process. It is important in the process, as becomes particularly apparent with the aid of FIG. 2, that the ends of the plug connections 18, 19 facing the sensor element 1 are not encapsulated with the material or the plastic of the housing 11 but left exposed in the region of the approximately rectangular areas 21, 22. The areas 21, 22 form punctiform contacts 23, 24 of the plug connections in the direction of the sensor element 1.

In addition, a positioning device 25 which is integrally formed with the housing 11 and comprises three guide elements 26, 27 and 31 is disposed in the interior space 16. Said guide elements have guide webs 28 which are aligned or disposed in such a manner that, in the case of the sensor element 1 disposed in the interior space 16, said sensor element 1 is positioned in a location in which in particular a reliable and safe electrical contacting of said sensor element 1 with the contacts 23, 24 of the plug connections 18, 19 occurs.

Figure 3:
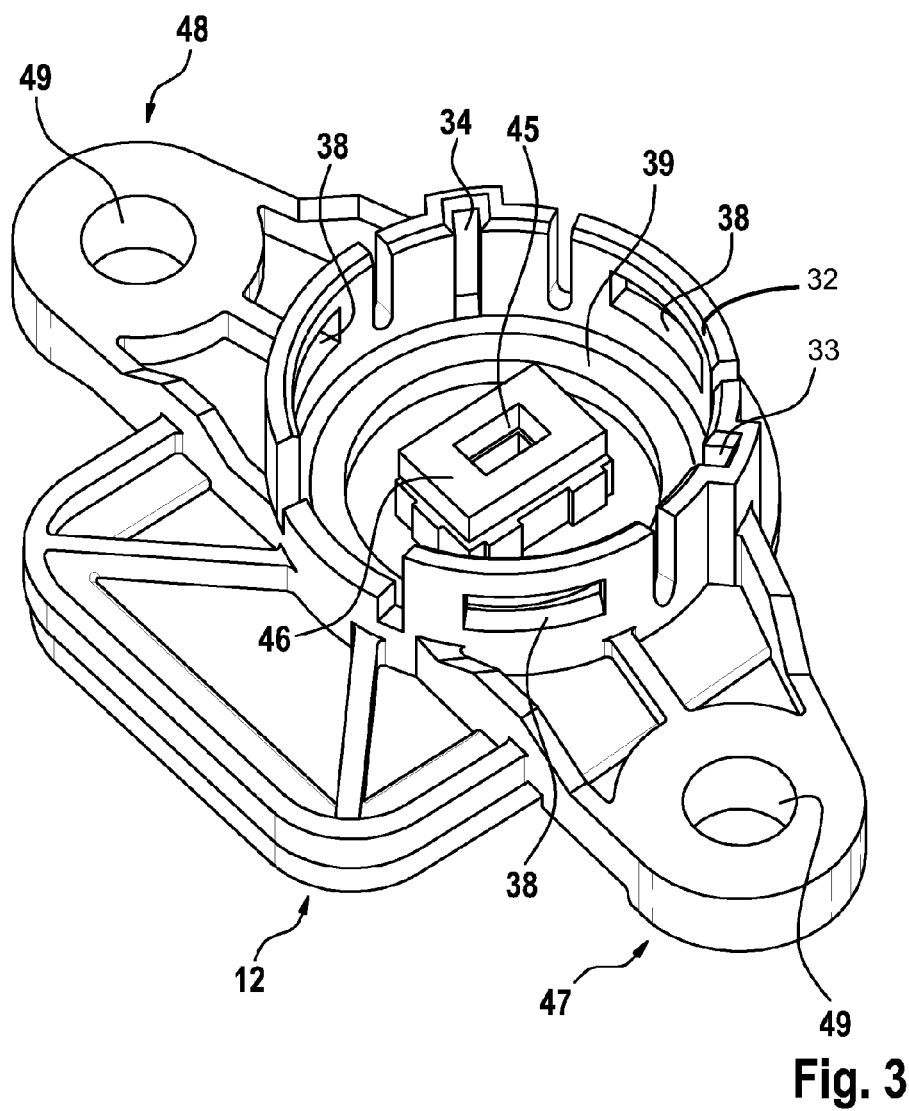
FIG. 3 depicts the underside of a housing cover for use with a sensor device pursuant to FIG. 1 in a perspective view.

Two web-like guide ribs 29, 30 are disposed on the outside of the wall 15 which interact with guide grooves 33, 34, which can be seen in FIG. 3 and are formed on a housing cover wall 32 in such a manner that the housing cover 12 can only be mounted on the housing 11 at a single (correct) angular position. Three locking clips 37 that are disposed offset by 120 with respect to each other are furthermore integrally formed on the outside of the wall as part of a latching connection 35 between the housing 11 and the housing cover 12, said locking clips interacting with locking openings 38 formed in the edge 32 of the housing cover 12. In order to seal off the sensor device 10 towards the outside when forming the latching connection 35 between the housing 11 and the housing cover 12 such that, e.g., moisture cannot penetrate into the sensor device 10, the housing cover 12 has an annular, elastic sealing element 39 in alignment with the wall 15 of the housing 11.

Figure 5:
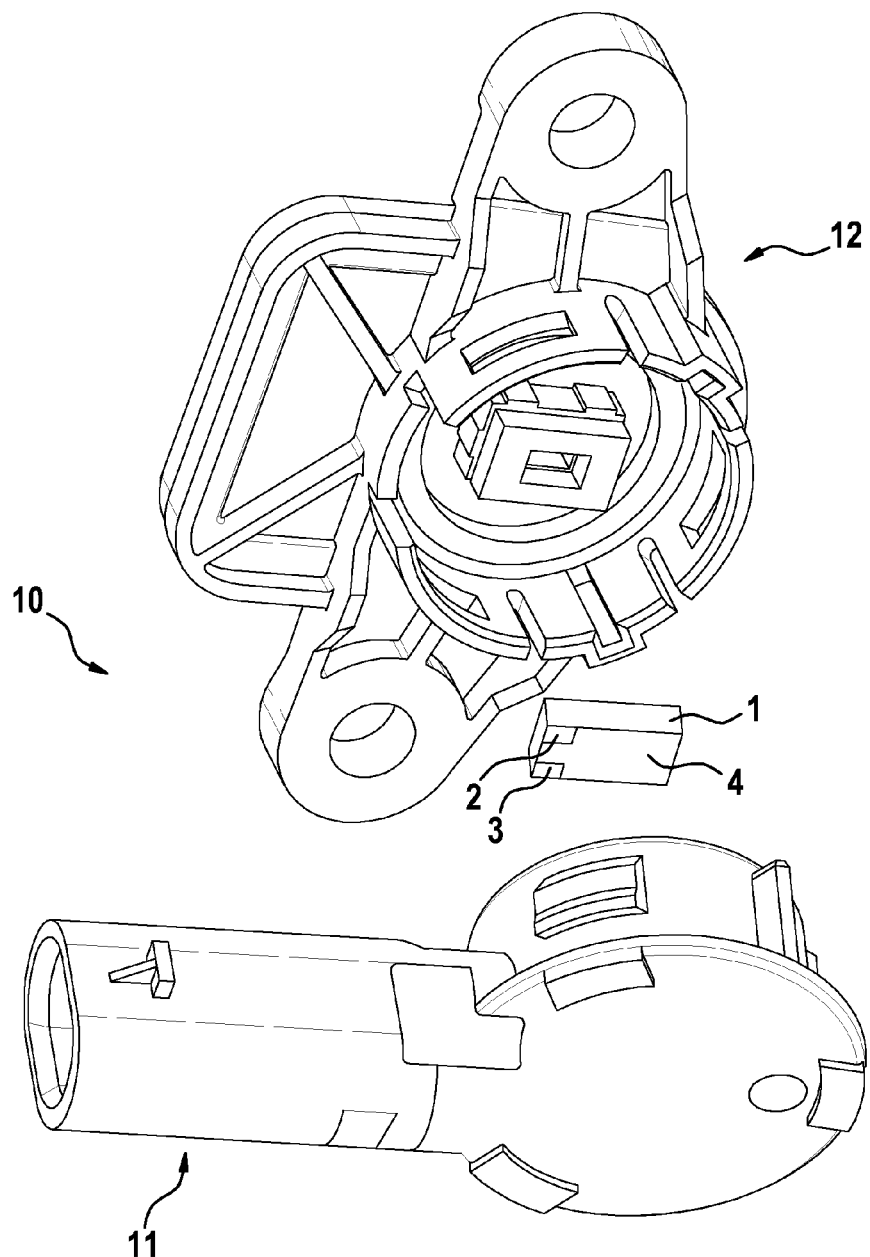
FIG. 5 depicts the components pursuant to FIG. 4 in a perspective view from below.

The sensor element 1 embodied as a pressure sensor is of block-shaped design and has two approximately rectangular contact areas 2, 3, which can be seen in FIG. 5, on the bottom side 4 thereof, said contact areas serving to electrically contact the sensor element 1 to the contacts 23, 24 of the plug connections. The sensor element 1 has a measurement surface 5 on the top side thereof, by means of which differences in air pressure can be detected and can be processed with an evaluation logic disposed in the sensor element 1.

According to the invention, provision is made for the disposal or attachment of the sensor element 1 in the housing 11 or, respectively, in the interior space 16 of the housing 11 to take place by means of a three-point contact. In so doing, the two contact areas 2, 3 together with the contacts 23, 24 of the plug connections 18, 19 form two of the three contact points. The third contact point is formed between the bottom side 4 of the sensor element 1 and a thrust bearing 42, which is disposed in the interior space 16 of the housing 11 so as to rise from the bottom of said interior space 16 towards the sensor element 1 and the top side 4 of which facing the bottom side 4 of the sensor element 1 is configured in a dome-like manner.

Figure 4:
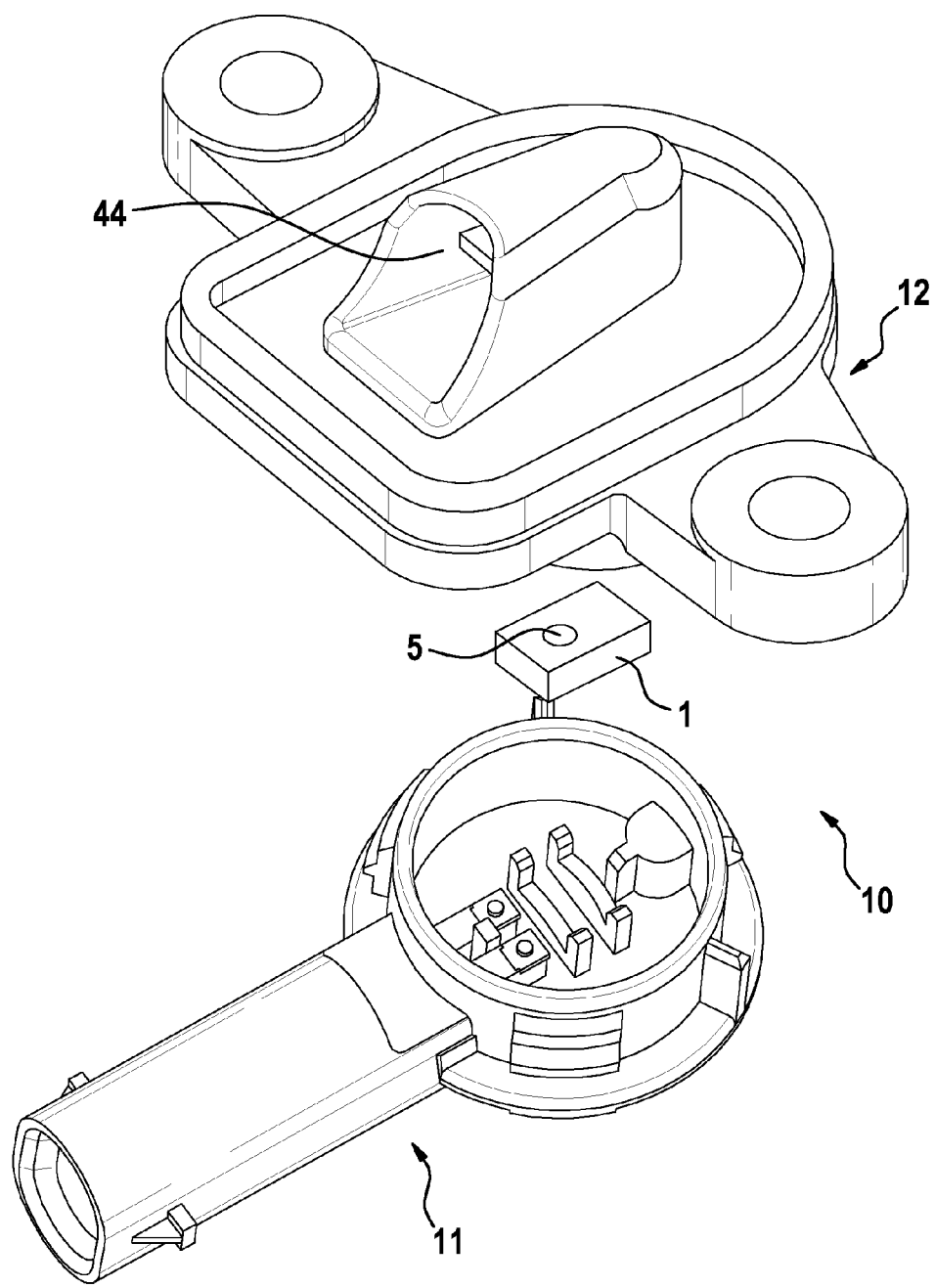
FIG. 4 depicts the housing, a sensor element and the housing cover of the sensor device pursuant to FIG. 1.

The housing cover 12 has on the outside thereof a measurement channel 44 that is open towards the surrounding environment of the sensor device 10, as can particularly be seen in an overall view of FIGS. 3 and 4. Said measurement channel opens out into an opening 45 in the overlapping region with the measurement surface 5 of the sensor element 1. The opening 45 is surrounded by an inner, second sealing element 46 which surrounds the measurement surface 5 at a distance when the housing cover 12 is mounted on the housing 11 and seals off said measurement surface towards the interior space 16 in such a manner that (air pressure) pressure fluctuations occurring across the measurement channel 44 act directly on the measurement surface 5 of the sensor element 1.

The housing cover 12 additionally comprises two mounting flanges 47, 48 having through holes 49 which serve to mount the sensor device 10 to one part of the motor vehicle.

The sensor device is installed as follows: In a first installation step, the sensor element 1 is introduced into the interior space 16 of the housing 11. A correct positioning of the sensor element 1, in particular with respect to the contacts 23, 24 and the thrust bearing 42 is thereby ensured by the positioning device 25 in such a manner that the aforementioned three-point contact is formed between the contact areas 2, 3 and the contacts 23, 24 of the plug connections as well as between the bottom side 4 of the sensor element 1 and the thrust bearing 42, said three-point contact ensuring a statically defined contact of the sensor element 1 in the housing. In a second installation step, the housing cover 12 is subsequently connected to the housing 11 by means of a latching connection 35. In so doing, a downward or contact pressing force is exerted by the second sealing element 46 on the sensor element 1 in the housing 11 in such a manner that in particular a reliable electrical contacting of the sensor element 1 is ensured in the region of the contacts 23, 24 of the plug connections. At the same time, the housing cover 12 is sealed towards the housing 11 by means of the sealing element 39. After mounting the housing cover 12 to the housing 11, the installation of the sensor device 10 is completed.

The sensor device 10 described to this point can be varied or modified in a variety of ways without deviating from the concept of the invention. Said inventive concept consists of a three-point contact of the sensor element 1 in the housing 1 in order to produce the reliable electrical contacting of the sensor element 1 to the plug connections 18, 19 which are arranged in a stationary or, respectively, fixed manner.

The invention claimed is:

1. A sensor device (10), having a housing (11) for accommodating a sensor element (1), wherein the sensor element (1) has electrical contact areas (2, 3) which are connected to electrical plug connections (18, 19) arranged in the housing (11) in an electrically conductive manner in a region of contacts (23, 24) of the plug connections (18, 19), wherein a force is applied to the sensor element (1) with a housing element for the purpose of making electrical contact between the electrical contact areas (2, 3) and the contacts (23, 24), characterized in that the contacts (23, 24) of the electrical plug connections (18, 19) are arranged in a stationary manner in the housing (11) with respect to the electrical contact areas (2, 3) of the sensor element (1), and in that a support for an underside of the sensor element (1) is formed between the sensor element (1) and the housing (11) in such a manner that the sensor element (1) has a three-point, rigid contact in the housing (11), and in that punctiform supports are formed respectively between the electrical contact areas (2, 3) and the contacts (23, 24) by forming the contacts (23, 24) in a punctiform manner to define two of the three rigid contact points, as well as in a support region between the sensor element (1) and the housing (11) by forming a support region (43) on the housing (11) in a punctiform manner to define a third of the three rigid contact points.

2. The sensor device according to claim 1, characterized in that the housing element is a housing cover (12) and in that the sensor element (1) is covered by the housing cover (12).

3. The sensor device according to claim 2, characterized in that an elastic intermediate element (46) is disposed between the housing cover (12) and the sensor element (1).

4. The sensor device according to claim 3, characterized in that the sensor element (1) has a measurement surface (5) which is surrounded by the intermediate element (46) and is sealed off towards a housing interior (16) and in that the housing cover (12) has a channel (44) which connects a region of the measurement surface (5) to the environment.

5. The sensor device according to claim 1, characterized in that the plug connections (18, 19) are encapsulated by means of injection molding in the region of the contacts (23, 24), so as to leave the contacts (23, 24) exposed, in the housing (11).

6. The sensor device according to claim 1 characterized in that the housing element is connected to the housing (11) by means of a latching connection (35).

7. The sensor device according to claim 6, characterized in that a sealing element (39) is disposed between the housing element and the housing (11), a force being applied to said sealing element when the latching connection (35) is formed.

8. The sensor device according to claim 6, characterized in that guide elements (29, 30, 33, 34) are present for the purpose of mounting the housing element on the housing (11) at a correct angular alignment.

9. The sensor device according to claim 1, characterized in that a positioning device (25) is provided in the housing (11) for the purpose of positioning the sensor element (1) with respect to the contacts (23, 24).

10. The sensor device according to claim 9, characterized in that the positioning device has at least one guide web (28) configured to locate two oppositely facing sides of the sensor element (1) with respect to the contacts (23, 24).

11. The sensor device according to claim 10, characterized in that the positioning device (25) further includes a guide element (31) spaced from the guide web (28) to locate a third side of the sensor element (1) with respect to the contacts (23, 24).

\* \* \* \* \*